Feb. 24, 1931. F. GIRARDI 1,793,690
CHANGE GEAR MECHANISM FOR AUTOMOTIVE VEHICLES
Filed Nov. 11, 1929 4 Sheets-Sheet 1

Inventor
Frank Girardi
By Rudolph M. Lotz
Attorney.

Feb. 24, 1931. F. GIRARDI 1,793,690
CHANGE GEAR MECHANISM FOR AUTOMOTIVE VEHICLES
Filed Nov. 11, 1929 4 Sheets-Sheet 2
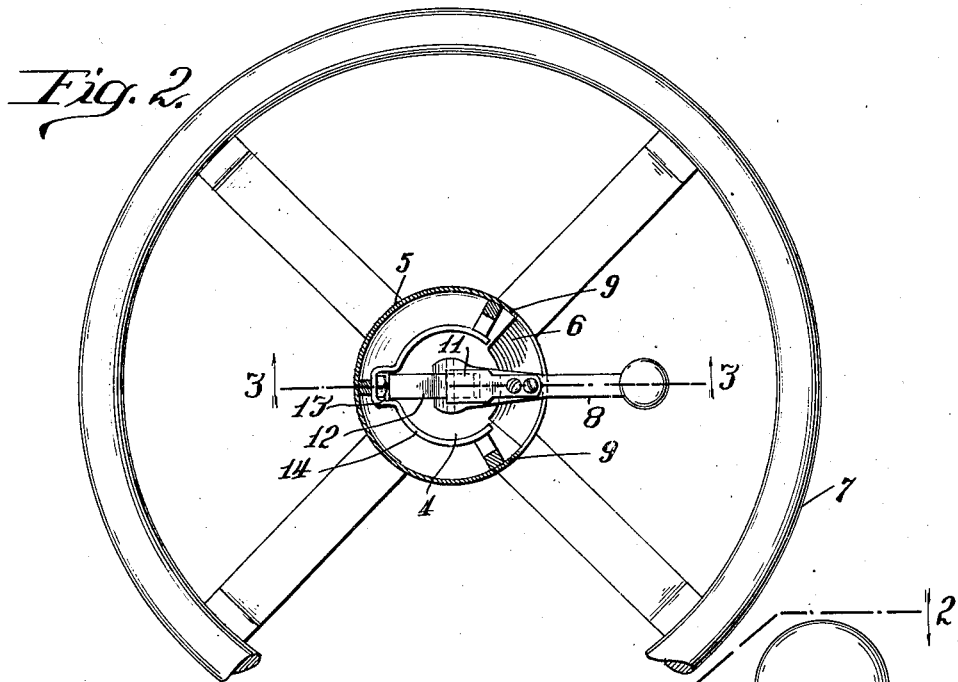
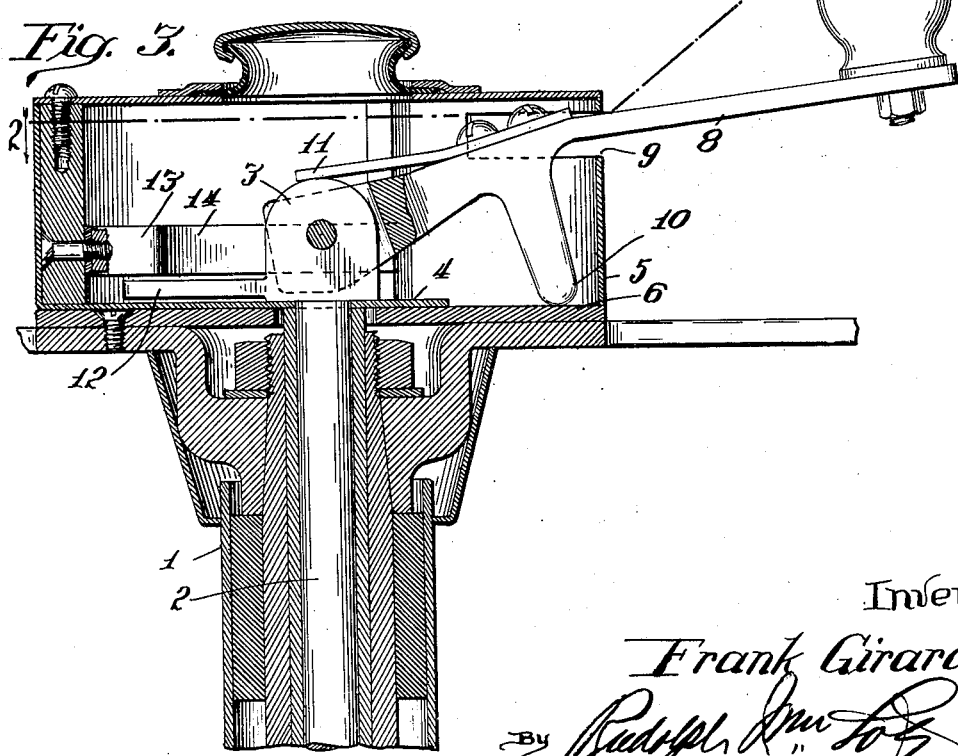
Inventor
Frank Girardi Feb. 24, 1931. F. GIRARDI 1,793,690
CHANGE GEAR MECHANISM FOR AUTOMOTIVE VEHICLES
Filed Nov. 11, 1929 4 Sheets-Sheet 3
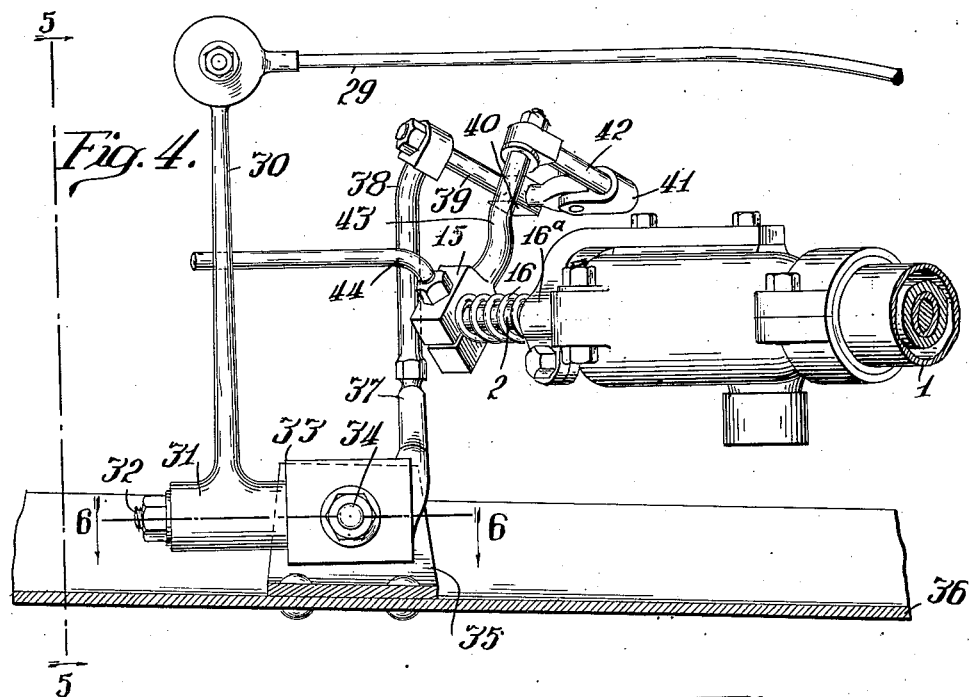
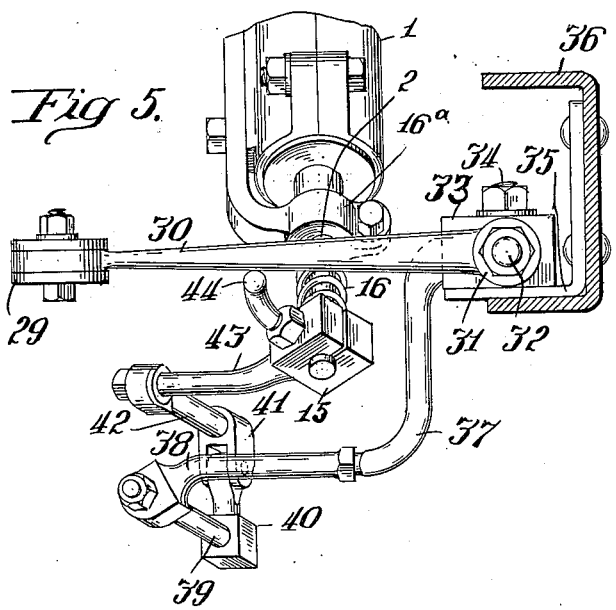
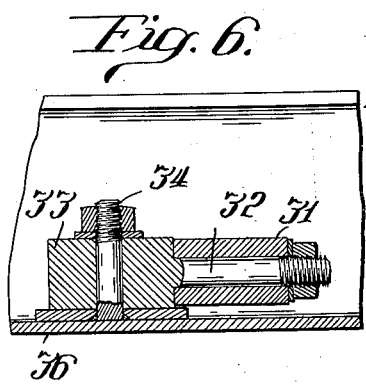
Inventor
Frank Girardi
By Rudolph [signature]
Attorney.

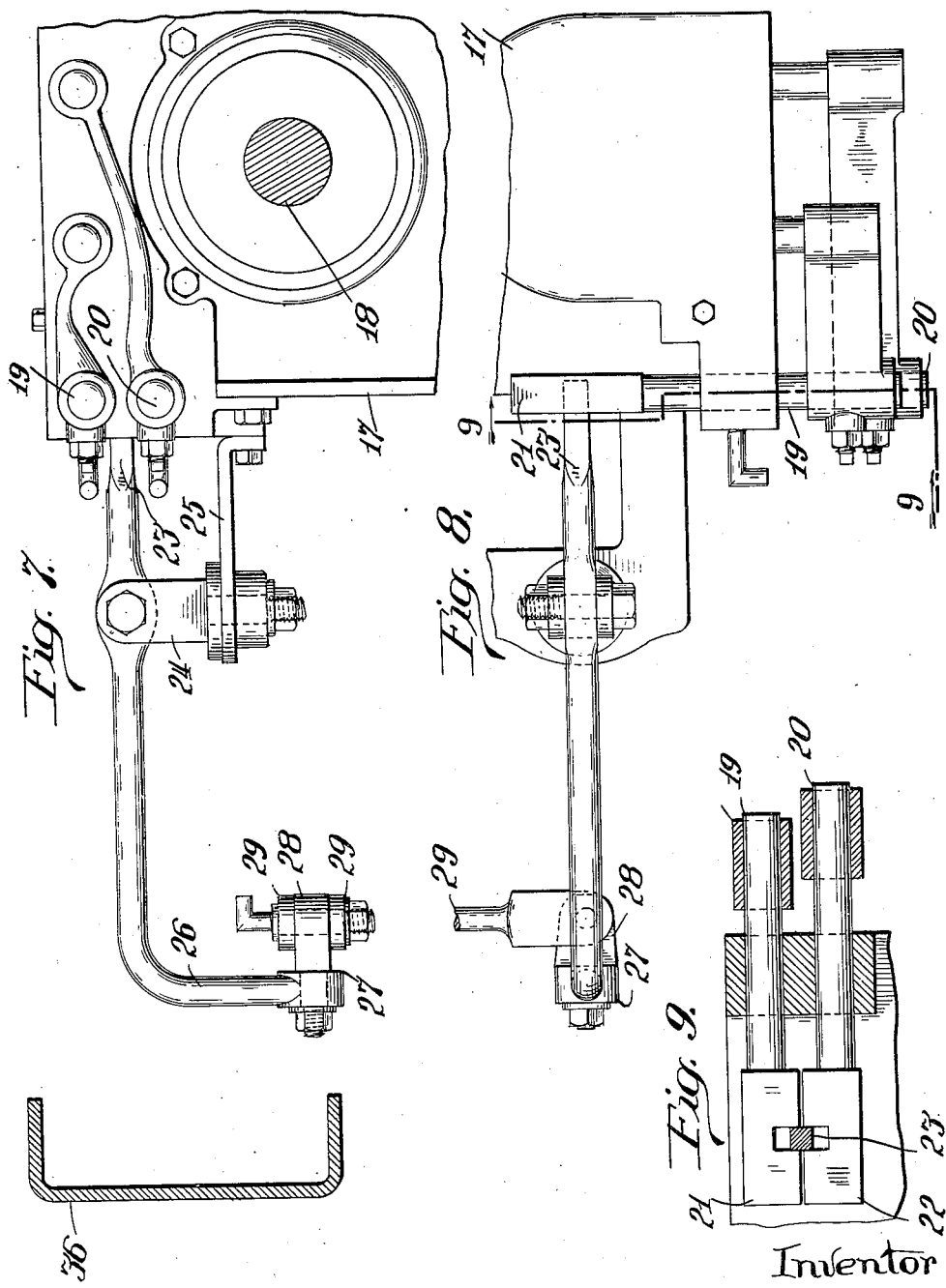

Patented Feb. 24, 1931

1,793,690

UNITED STATES PATENT OFFICE

FRANK GIRARDI, OF CHICAGO, ILLINOIS, ASSIGNOR TO SELF AND EDWARD B. DUBLIN, OF CHICAGO, ILLINOIS

CHANGE-GEAR MECHANISM FOR AUTOMOTIVE VEHICLES

Application filed November 11, 1929. Serial No. 406,250.

This invention relates to change-speed gear-set operating mechanism and has for its general object to provide mechanism of this type which is directly associated with the steering post and steering wheel of an automotive vehicle in such manner as to obviate lateral projection from the steering post and also provide additional floor space adjacent the driver's seat now generally occupied by the gear-shift lever.

The specific objects of the present invention are:

First. To provide a mechanism of the type specified which is associated with the conventional type of change-speed gear-sets of automotive vehicles without changing the normal position of said gear set and its casing.

Second. To provide simple and easily operable mechanism of the type specified which is so constructed and arranged as to be positive in action and not readily liable to disorder.

Other objects of the invention will be readily understood from the following specification.

A suitable embodiment of the invention is illustrated in the accompanying drawings wherein:

Fig. 2 is a plan section on the line 2—2 of Fig. 3 showing the steering wheel and the control lever constituting part of the mechanism of this invention.

Fig. 3 is a fragmentary detail section on the line 3—3 of Fig. 2 showing the steering post, steering wheel and the control lever and main shaft of the said mechanism.

Fig. 4 is a plan view of the said mechanism, the steering post and a side frame member of the chassis being shown in section.

Fig. 5 is a vertical transverse section on the line 5—5 of Fig. 4.

Fig. 6 is a detail vertical section on the line 6—6 of Fig. 4.

Fig. 7 is a vertical transverse section on the line 7—7 of Fig. 1.

Fig. 8 is a detail plan view showing the main shaft lever of the mechanism in association with the shift rods of the change-speed gear-set.

Fig. 9 is a sectional view on the line 9—9 of Fig. 8.

Figure 1:
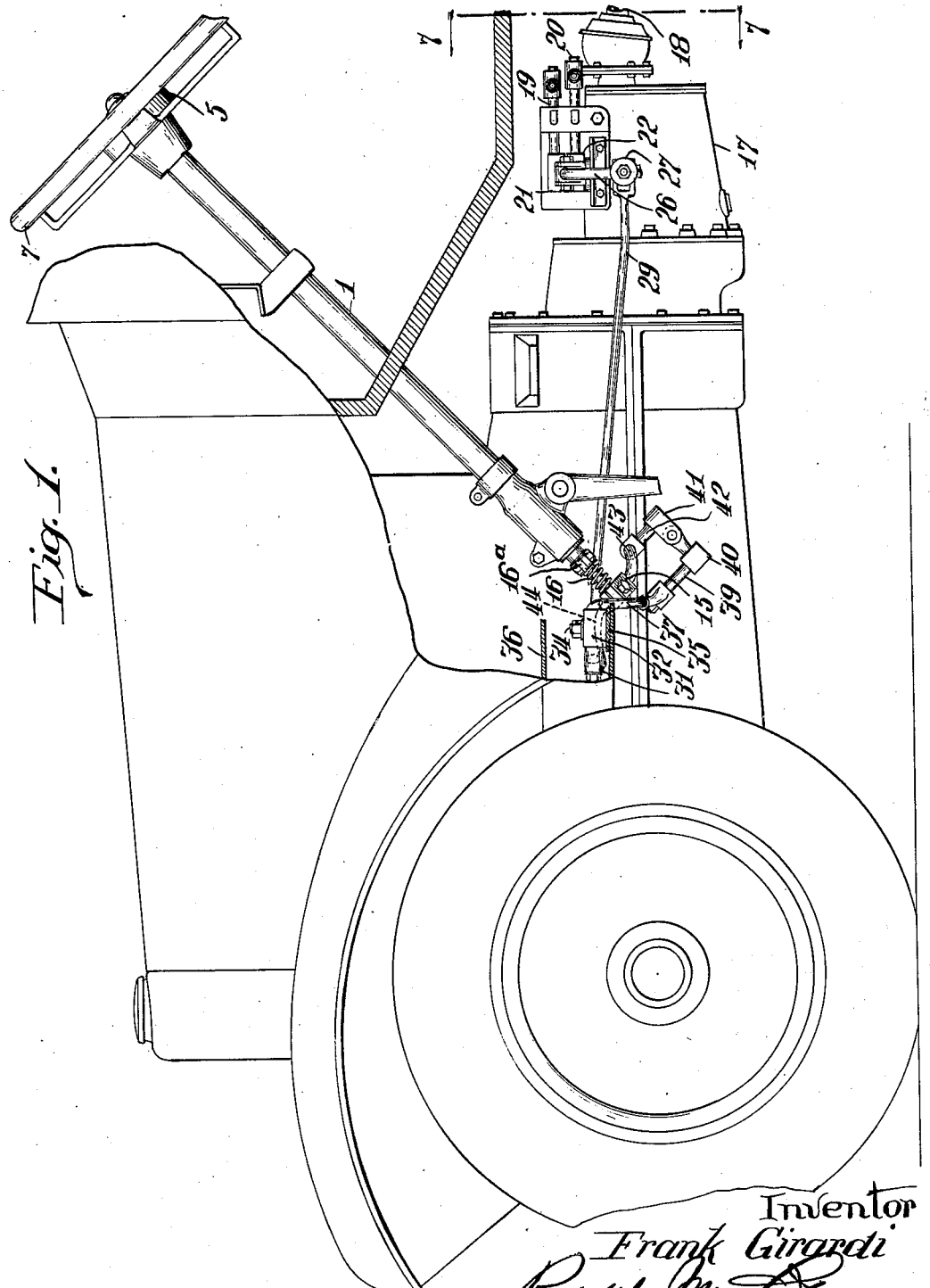
Fig. 1 is a fragmentary vertical longitudinal sectional view through the front portion of a conventional automotive vehicle at one side of the engine and steering post, the latter and the mechanism of this invention being shown in side elevation.

The present invention is in the nature of an improvement upon the mechanism described and claimed in my pending allowed application for Letters Patent, Serial No. 300,162, filed August 17, 1928, which matured into Patent Number 1,758,315, wherein the change-speed gear-set is positioned at right angles to its normal position on the chassis of the vehicle. This has been found very objectionable for several reasons and has defeated adoption of the mechanism of that invention as standard equipment. The present invention, to some extent, embodies parts very similar in construction and arrangement with those of the mechanism described and claimed in said application but includes elements materially different from the latter and, therefore, involves certain important distinctions.

The hollow or tubular steering post 1 of the vehicle shown in the drawings forming a part of the present invention, is of conventional construction except insofar as it provides a bore for the reception of the reciprocable and rotatable shaft 2. The latter is provided at its upper end with a head 3 which normally rests upon the bottom plate 4 of a casing 5 supported upon a plate 6 secured to the steering wheel 7. Said plate 4 and casing 5 are non-rotatable.

Pivotally connected at one end with the head 3 of the shaft 2 is a lever 8 which projects through a slot 9 in the casing 5 and is provided between its ends with a fulcrum arm 10 which rests at its lower end upon the plate 6, the plate 4 being provided with a segmental slot or cut-out through which the plate 6 is partly exposed. A flat spring 11 mounted on the lever 8 bears upon the head 3 to frictionally resist pivotal movement of said lever relatively to said head. The arcuate movement of said lever 8 relatively to the casing 5 is limited by the end walls of the slot in the casing.

The said head 3 is provided with a lateral arm 12 which, when said shaft 2 is raised by depression of the outer end of the lever 8 when the latter is disposed midway between the limits of its lateral movement, will pass upwardly through the recess 13 in the arcuate member 14 of the casing and then, as said lever 8 is swung arcuately, will ride upon said member 14 and prevent the return of the shaft 2 and lever 8 to the position of Fig. 3 until the said lever is returned to its intermediate or "neutral" position.

The shaft 2 is equipped at its lower end with a collar 15 which is suitably rigidly clamped thereon. A spring 16 is interposed between said collar and a clamp member 16ª at the lower end of the steering post to hold said shaft 2 normally at the lower limit of its movement.

The conventional change-speed gear-set casing 17 is shown in Fig. 1 in its usual position on the chassis with respect to the propeller shaft 18 and the steering gear. The shift rods 19 and 20 of said gear-set are shown in Figs. 1, 7, 8, and 9. Fig. 9 shows the blocks 21 and 22 associated respectively with the rods 19 and 20, said blocks being provided with recesses in their opposed faces which are in register when the rods 19 and 20 are in "neutral" position.

The squared end portion of a shift lever 23 is adapted to engage in either one of said recesses of the blocks 21 and 22.

Said lever 23 is pivotally engaged between its ends in the bifurcated end of a member 24 rotatably mounted in a bracket 25 secured to the casing 17, thus permitting said lever to swing on its own pivot and upon an axis perpendicular thereto. In swinging upon the last-named axis (of member 24) the squared end of said lever will shift in the recesses of the blocks 21 and 22 preparatory to shifting said respective blocks for change-gear purposes.

The outer end portion of the lever 23 is provided with an arm 26 terminating in a hub element 27 in which the shank of a member 28 engages, the latter having a flat sided head which is received in the bifurcated end member of an arm 29 which is rigidly associated with the arm 30 of a sleeve 31 at its other end.

The sleeve 31 is rotatable on the stud-shaft 32 of a block 33 which, in turn, is rotatable on the stud-shaft 34 of a bracket 35 mounted on the side frame member 36 of the chassis, said stud-shafts 32 and 34 being perpendicular with relation to each other.

The block 33 is rigid with an L-shaped arm 37 having an angular end portion 38 which is pivotally secured to one end of the arm 39 of a block 40. The latter is pivotally connected with a companion block 41, the axis of said pivotal connection being perpendicular to the arm 39 and substantially parallel with the arm 37, and also perpendicular to the axis of the pivotal connection between the arms 37 and 39.

The block 41 is rigidly mounted upon the outer end of an arm 42 which is substantially parallel with the arm 39 and is pivotally connected at its other end with an arm 43 of the collar 15 of the shaft 2, the axis of the last-named pivotal connection being substantially parallel with that of the connection of the blocks 40 and 41.

Said collar 15 is also provided with a rigid L-shaped arm 44 the outer end of which supports and serves to raise and lower the arms 30 and 29 as said shaft 2 is reciprocated.

By referring to Figs. 4 and 5, it will be noted that the shaft 2 is angularly disposed with respect to the pivotal axes of the stud-shafts 32 and 34 and that, as said shaft 2 is rotated, the arm 37 of the block 33 swings in a horizontal plane. The several pivotal connections, by means of which the collar 15 is associated with the said arm 37, constitute the substantial equivalent of a universal joint which permits the associated arms 37, 39, 42, and 43 to adjust themselves to the various positions required to permit substantially unresisted transmission of motion from the shaft 2 to the arm 37.

The operation of the mechanism is as follows:

As the lever 8 is rotated to the right or left from the position shown in Figs. 2 and 3, the arm 44 will swing from the uppermost point of its arcuate movement to a lower point thus permitting the arms 30 and 29 to drop slightly. This movement is transmitted to the lever 23 to rotate the same about the axis of its pivotal connection with the member 24 thus causing the squared end of the lever 23 to enter the recess in the shift block 21.

This movement of the lever 23 is followed instantly by its swing about the pivotal axis of the member 24 relatively to the bracket 25 to impart reciprocable motion to the block 21. The latter is transmitted by the universal joint connection between the shaft 2 and the arm 37 of the block 33 whereby the latter is swung on the axis of the stud-shaft 34 which causes the arms 30 and 29 to be swung about this pivot.

While both swinging movements of the lever 23 would appear to occur simultaneously, the flexibility of the universal joint is such that the movements occur in the order named.

The gear-set is now arranged to impart either reverse or slow forward travel to the vehicle provided the clutch is in. To change to "second" or "high", the lever 8 is swung back to "neutral" and its outer end depressed to thereby throw the arm 12 of the head 3 to a level above the member 13 whereupon the said lever 8 is turned to right or left as desired.

This depression of the lever 8 imparts upward movement to the shaft 2 and arm 44. The latter thus swings the arms 30 and 29 on the axis of the stud-shaft 32 and causes the lever 23 to be rocked in the direction to throw its squared end into the recess of the shift block 22 so that as soon as the lever 8 is swung to right or left, the said shift block 22 will move longitudinally. As the shift rods 19 and 20 move with the respective blocks 21 and 22, the change-speed gear-set will be correspondingly affected.

I claim as my invention:

1. In combination with the change-gear set and steering wheel of an automotive vehicle, an operating mechanism for said set including a shaft axially disposed in the steering post, a hand lever for rocking and reciprocating said shaft, a spring for maintaining said shaft normally at the lower limit of its movement, a single lever rotatable on axes perpendicular to each other and operatively associated with the shift rods of the change-speed gear-set for controlling the latter, a rocking member pivotally mounted on a frame element of the vehicle, a rocking arm pivotally associated with said member for rotation on an axis perpendicular to that of the latter and connected at its other end with said lever, an arm rigid with said member, universal joint connection between said arm and said shaft for imparting arcuate movement to said member as said shaft is rotated, and a lateral arm on said shaft engaging said pivoted arm of said member for swinging the same on its pivotal connection with said member as said shaft is rotated when in its lower position and as the same is reciprocated.

2. In combination with the change-gear set and steering wheel of an automotive vehicle, an operating mechanism for said set including a shaft axially disposed in the steering post, a hand lever for rocking and reciprocating said shaft, a spring for maintaining said shaft normally at the lower limit of its movement, a single lever rotatable on axes perpendicular to each other and operatively associated with the shift rods of the change-speed gear-set for controlling the latter, a member mounted on the vehicle chassis, a member associated with said lever and pivotally associated with the member mounted on the chassis for universal movement, an arm on said shaft having universal joint connection with said member for imparting pivotal movement to the latter about one axis as said shaft is rotated, and an arm on said shaft engaged with said member for imparting pivotal movement to the latter about an axis perpendicular to the first-mentioned axis as said shaft is reciprocated.

3. In combination with the change-gear set and steering wheel of an automotive vehicle, an operating mechanism for said set including a shaft axially disposed in the steering post, a hand lever for rocking and reciprocating said shaft, a spring for maintaining said shaft normally at the lower limit of its movement, a single lever rotatable on axes perpendicular to each other and operatively associated with the shift rods of the change-speed gear-set for controlling the latter, an L-shaped arm pivotally associated at one end with said lever and universally pivotally associated at its other end with the vehicle frame, a lever operatively associated with said arm for swinging the latter on a vertical axis, an arm on said shaft, a universal joint connection between said arm and said lever for oscillating the latter as said shaft is rotated, and an arm on said shaft engaged with said L-shaped arm between the ends of the latter for swinging the same on a horizontal axis as said shaft is reciprocated.

4. The combination with the shift rods of the change-gear set of an automotive vehicle, of an operating mechanism comprising a rotatable and reciprocable shaft extending from a point within reach of the driver through the body of the vehicle, a bearing for said shaft, a support for said bearing, a hand-lever secured to the upper end of said shaft for reciprocating and rocking the latter, a spring for maintaining said shaft normally at the lower limit of its movement, a single lever rotatable on axes perpendicular to each other and operatively associated with the shift rods of the change-speed gear-set for controlling the latter, an L-shaped arm pivotally associated at one end with said lever and universally pivotally associated at its other end with the vehicle frame, a lever operatively associated with said arm for swinging the latter on a vertical axis, an arm on said shaft, a universal joint connection between said arm and said lever for oscillating the latter as said shaft is rotated, and an arm on said shaft engaged with said L-shaped arm between the ends of the latter for swinging the same on a horizontal axis as said shaft is reciprocated.

FRANK GIRARDI.